United States Patent
Berggren

(10) Patent No.: US 12,496,984 B2
(45) Date of Patent: Dec. 16, 2025

(54) MOUNT AND IMPROVEMENT GPS TRACKER FOR EQUIPMENT

(71) Applicant: WAIV Technologies, Inc., San Diego, CA (US)

(72) Inventor: Magnus Henrik Berggren, San Diego, CA (US)

(73) Assignee: WAIV Technologies, Inc., San Diego, CA (US)

(*) Notice: Subject to any disclaimer, the term of this patent is extended or adjusted under 35 U.S.C. 154(b) by 446 days.

(21) Appl. No.: 17/898,366

(22) Filed: Aug. 29, 2022

(65) Prior Publication Data

US 2023/0111607 A1 Apr. 13, 2023

Related U.S. Application Data

(60) Provisional application No. 63/238,203, filed on Aug. 29, 2021.

(51) Int. Cl.
| | | |
|---|---|---|
| *B60R 11/02* | (2006.01) | |
| *G08G 1/00* | (2006.01) | |
| *H04W 4/029* | (2018.01) | |
| *B60R 16/03* | (2006.01) | |
| *G07C 5/00* | (2006.01) | |

(52) U.S. Cl.
CPC ............ *B60R 11/0258* (2013.01); *G08G 1/20* (2013.01); *H04W 4/029* (2018.02); *B60R 16/03* (2013.01); *G07C 5/008* (2013.01)

(58) Field of Classification Search
CPC ..... B60R 11/0258; B60R 11/02; B60R 16/03; H04W 4/029; G08G 1/20; G07C 5/008

USPC .......................................................... 701/32.4
See application file for complete search history.

(56) References Cited

U.S. PATENT DOCUMENTS

| | | | | |
|---|---|---|---|---|
| 10,200,522 | B2* | 2/2019 | Berggren | B63B 49/00 |
| 10,546,501 | B2* | 1/2020 | Berggren | G07C 5/008 |
| 11,876,329 | B2* | 1/2024 | Mizrahi | H01R 13/631 |
| 12,050,953 | B2* | 7/2024 | Khoche | B32B 37/12 |
| 12,061,946 | B2* | 8/2024 | Khoche | G06K 19/0702 |
| 2004/0040325 | A1* | 3/2004 | Evans | B60H 1/00364 |
| | | | | 62/235.1 |
| 2016/0269530 | A1* | 9/2016 | Berggren | H04W 4/12 |

(Continued)

FOREIGN PATENT DOCUMENTS

| | | | | |
|---|---|---|---|---|
| CN | 203288619 | U * | 11/2013 | |
| CN | 109747571 | A * | 5/2019 | G04G 13/026 |
| CN | 214786718 | U * | 11/2021 | |

*Primary Examiner* — Andrew Joseph Rudy
(74) *Attorney, Agent, or Firm* — James Scott Nolan

(57) ABSTRACT

An apparatus for use with a vehicle includes a waterproof enclosure having electronic circuitry with wireless communication, a solar panel to power the electronic circuitry, a keypad to receive input from a user to activate the electronic circuitry, and a motion sensor to detect a motion and/or location of the waterproof enclosure to generate motion data and/or location data. When activated by the input from the user applied to the keypad, the electronic circuitry is configured to analyze the motion data and/or the location data for determining a type of action being performed by the user and communicate data indicating the determined type of action wirelessly via the wireless communication. The apparatus further includes a mounting structure for mounting the waterproof enclosure to a surface of vehicle.

1 Claim, 3 Drawing Sheets

(56) References Cited

U.S. PATENT DOCUMENTS

2018/0133311 A1\* 5/2018 Thielemans ........... A61K 39/39
2019/0141178 A1\* 5/2019 Berggren ................ H04M 1/18

\* cited by examiner

MOUNT AND IMPROVEMENT GPS TRACKER FOR EQUIPMENT

CROSS REFERENCE TO RELATED APPLICATIONS

This application claims the benefit of U.S. Provisional Application No. 63/238,203, filed Aug. 29, 2021. This application is incorporated herein by reference in its entirety.

BACKGROUND

It has become very popular to mount electronic devices ("devices") such as cameras onto sports equipment ("equipment"). For example, GoPro, a well-known camera manufacturer, offers many types of mounts, including self-adhesive mounts. Some of their self-adhesive mounts are designed to be attached to curved surfaces for example. a motor cycle helmet. These mounts are designed in such a way that the self-adhesive surface has a similar curvature to the equipment they are mounted to. This ensures maximum amount of contact between the adhesive surface of the mount, and the surface of said equipment.

One way to increase the adhesive strength of a self-adhesive mount, is to make the mount bigger, and thus increase the total area of the self-adhesive surface. The size of the mount also depends on the size of the device being mounted. A larger device may require a larger mount. One challenge with a mount that has a larger self-adhesive surface, is that it oftentimes it becomes more difficult to make the curvature of the self-adhesive surface match precisely to the curvature of said equipment.

There are many ways to enclose an electronic device in a waterproof enclosure. For example, a manufacturer such as GoPro® or Otterbox® manufacture cases made in hard plastic used to enclose electronic devices. However, setting up manufacturing of hard plastic cases is expensive as it requires creating a mold or "tool", for the plastic part.

Accordingly, there is a need for an electronic device with GPS tracking and wireless communication capabilities, where the electronic device is fully waterproof, resistant to saltwater and other chemicals, and has at least some transparency so that LED indicators can be visible through the enclosure and so that a solar panel on the device can be exposed to the sun. An enclosure of the electronic device needs to accommodate an ability to depress button on the device. The enclosure needs to fit snuggly around the device, and take the same shape as the device so that it is visually pleasing and so that the maximum amount of sunlight is let through to reach the solar panel, even when sunlight is hit from an angle. Finally, the apparatus and enclosure needs to be manufactured without the need of creating a tool or a mold, to allow re-designs of the shape of the device to happen quickly, and without incurring the cost of creating a new mold/tool.

Rental operators that rent out vehicles such as golf carts, bikes and jet-skis are oftentimes concerned whether their customers are handling their vehicles with proper care. Therefore, it is beneficial if said rental operator can be alerted in real time whenever a vehicle has collided, or if it is being operated in a "reckless" way. For example, a golf car driver that drives over speedbumps and potholes without slowing down could be considered a "reckless" driver, and such driving style could over time increase the cost of repair and maintenance of said vehicle.

It is often desired to limit the speed of Jet-Skis or other vehicles in certain geographic regions. For example, Jet-Ski rental companies that operates near regions with imposed speed limits, may want to prevent their customer to exceed the speed limit in such regions. One existing technical solution is to use so called geofenced engine throttlers. This type of device has a built in GPS tracker that contains information about geographic boundaries a.k.a. geofences, and also connects to the engine so that the Jet-Ski's output power can be limited when it is located within a geofence.

The present invention relates to a GPS tracking and communication system for fleet management of equipment, and more particularly to a solar-powered, waterproof, weatherproof GPS tracking device that communicates with a tracking and management application on a computing tracking device.

SUMMARY

This document describes a self-adhesive mount that allows an object such as an electric device, to be mounted to various types of equipment with different form and shape, in such way that the curvature of the self-adhesive mount will automatically adapt to the curvature of the equipment, to create a waterproof enclosure that fulfills the aforementioned requirements.

A motion sensor comprising an accelerometer can be used to provide real time text alerts in cases when a vehicle has been collided or is being driven recklessly, across a range of different type of vehicles including but not limited to golf carts, bikes, boats and jet-skis. This approach has the added benefit of not requiring an electrical connection to the vessel, thus may reduce the installation effort.

This document further describes a tracking and communication system for locating and managing a fleet of equipment. In some preferred implementations, the fleet of equipment includes rental watercraft. Examples of such watercraft include, but are not limited to, jet-skis, wave-runners, sailboats, catamarans, powerboats, cruisers, pontoons, rafts, kayaks, canoes, stand-up-paddleboards, pedal boats, surfboards, wakeboards and yachts. Accordingly, a tracking and communication system includes a waterproof and weatherproof GPS tracking device that is easily attached to each watercraft and integrated into the communication system. The communication system further includes a client application running on a client computing tracking device. The client application can receive GPS tracking data from the GPS tracking device, interpret the data in various beneficial ways, and display the interpreted data both graphically and alphanumerically. For instance, GPS tracking data can be interpreted to discern whether a renter of a boat is using the rented boat only within a proscribed area, or whether the renter has exceeded requisite geographical or time limits.

In some aspect, a system and method include using a tracking device for coupling with each of a plurality of rental equipment, the rental equipment being subject to a rental agreement that represents a duration and/or a geographical limitation for the rental equipment. The tracking device includes a flexible, waterproof outer enclosure having one or more solar panels for converting solar energy to electricity for the tracking device. The tracking device further includes a rigid inner enclosure housed by the flexible, waterproof outer enclosure, and a global positioning system (GPS) device embedded in the rigid inner enclosure and being powered by electricity from the one or more solar panels.

The tracking device further includes a transceiver embedded in the rigid inner enclosure and being powered by electricity from the one or more solar panels, the transceiver for receiving and transmitting signals to and from a communication network, and logic circuitry embedded in the rigid inner enclosure and being powered by electricity from the one or more solar panels. The logic circuitry receives GPS data from the GPS device and sends the GPS data to the transceiver for transmitting by the transceiver to the communication network. A system and method further includes a server system executing a fleet management application, the server system receiving the GPS data from the tracking device via the communication network, and processing the GPS data to generate a set of analytical information to representing geographical data during the duration of the rental agreement.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a self-adhesive mount that allows an object such as an electric device, to be mounted to various types of equipment with different forms and shapes, in such way that a curvature (or lack thereof) of the self-adhesive mount will automatically adapt to the curvature of said equipment.

Figure 1:
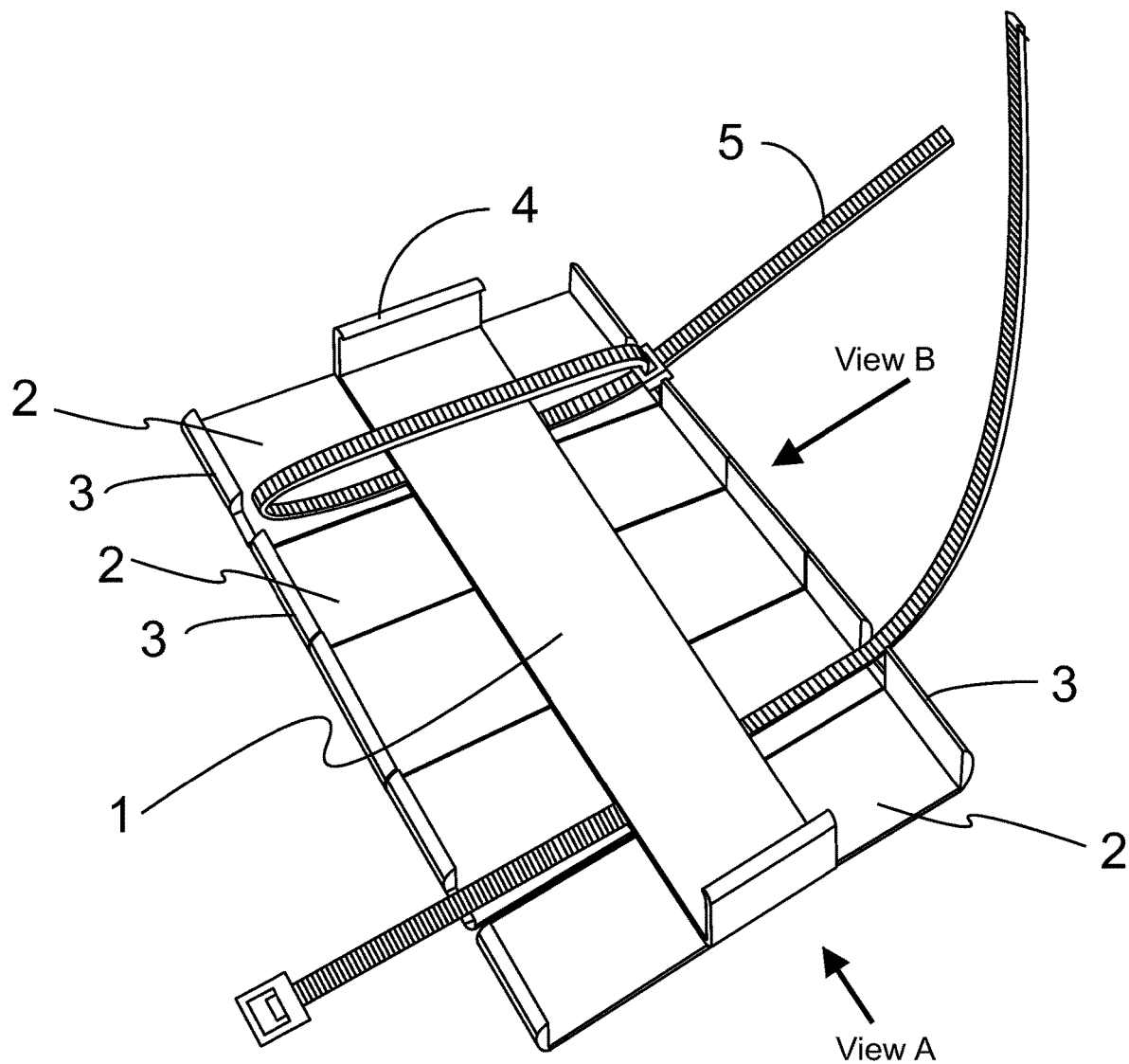
FIG. 1 illustrates a mount in perspective view of a self-adhesive mount for an electronic device.

FIG. 1 illustrates a mount for an electronic device in perspective view, for mounting the electronic device on equipment 20 such as, for example, a jet ski, a boat, a surfboard, or other vehicle. The mount includes a center section ("body") 1, one or more flexible legs 2 that protrude from the body 1, one or more wall segments 3, with each wall segment 3 being attached to the end of a leg 2, and one or more stoppers 4. The bottom side of the legs 2 are coated with an adhesive, such as mounting tape, so that the legs 2 can adhere to said equipment. The body, legs, wall segments and stoppers can be made of the same piece of plastic, but the thickness of the body 1 may be thicker to make it rigid, and the thickness of the legs 2 may be thinner, to make them flexible. The mount can also include one or more cable ties 5. Each cable tie 5 passes through a hole in the body, so that once the cable tie loop has been closed, it cannot be removed from the body (without force or being cut). FIG. 1 also illustrates the viewpoints ("View A") and ("View B") that show additional features of the mount.

Figure 2:
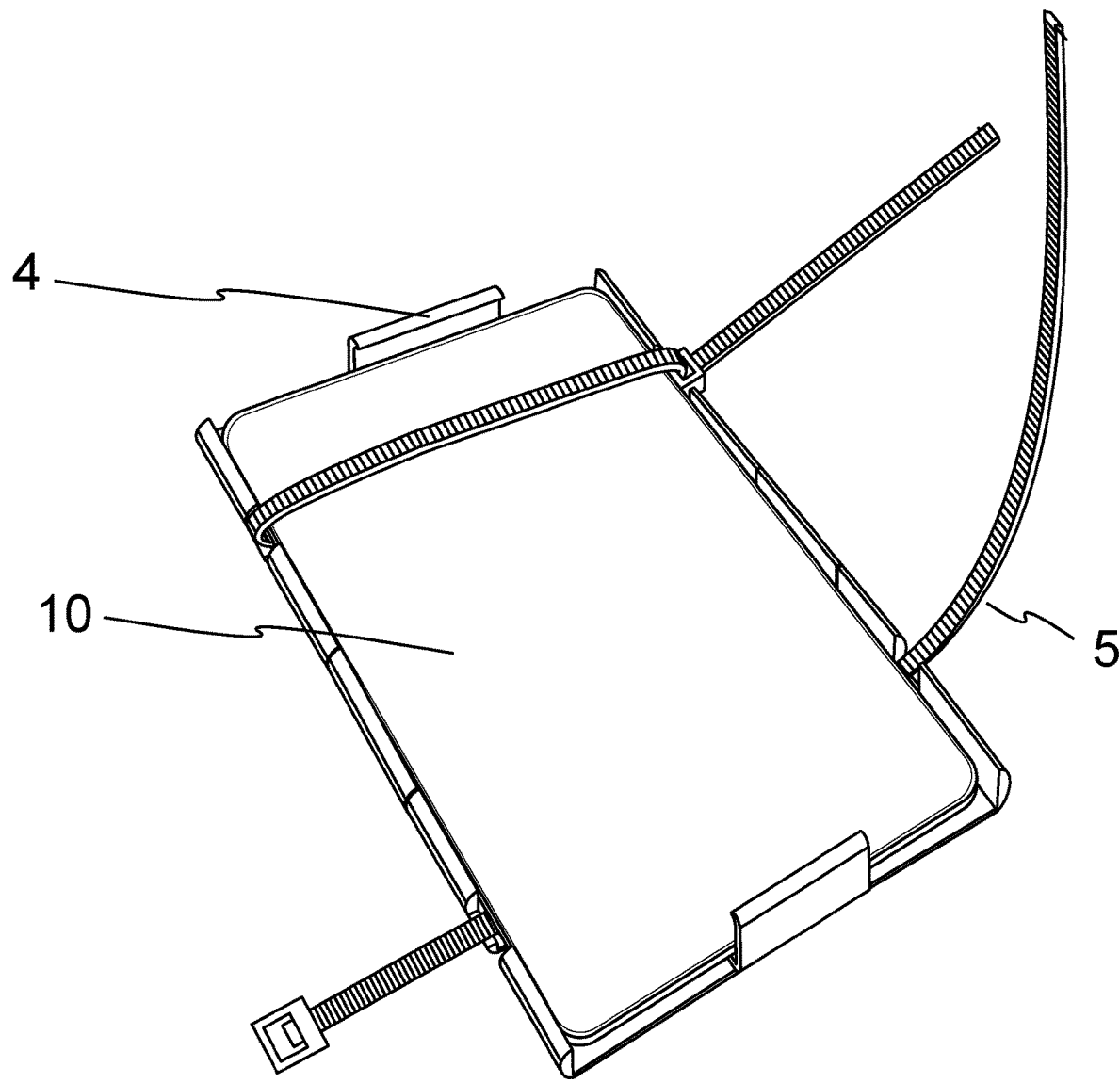
FIG. 2 illustrates an electronic device that is inserted into the mount illustrated in FIG. 1.

FIG. 2 illustrates an electronic device 10 that is inserted into the mount. The electronic device 10 is held in place by the cable ties 5. The stoppers 4 prevent the electronic device from sliding out of the mount.

Figure 3:
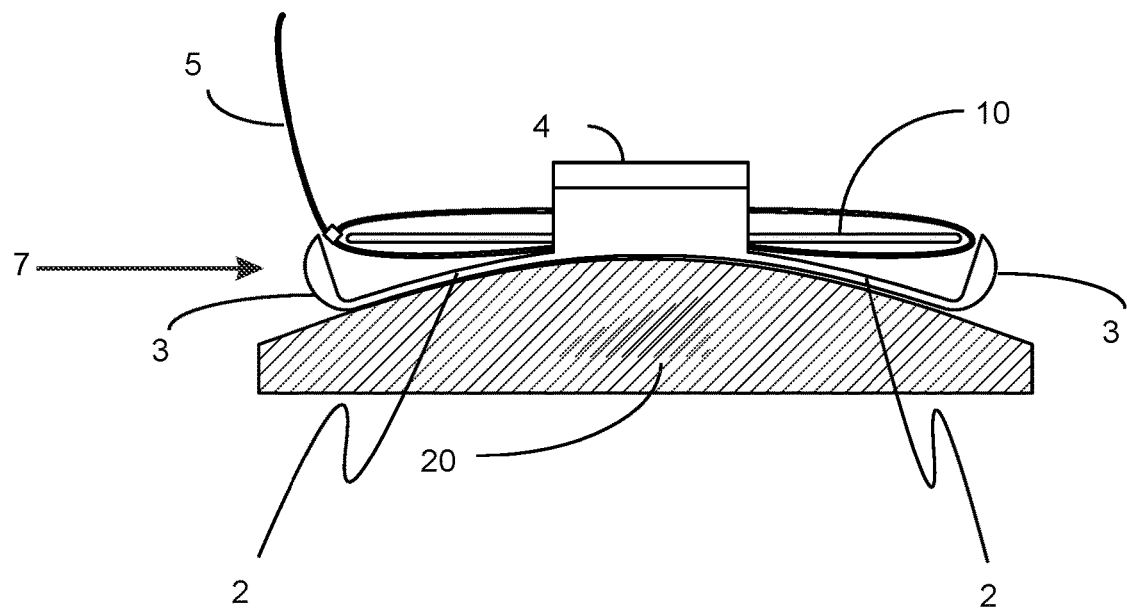
FIG. 3 illustrates a side view of a mounted device.

FIG. 3 illustrates side view "View A" of a mounted device, in which the electronic device 10 is fixed to the body of the mount using cable ties 5. Note that the body itself is obscured by stopper (2) in this figure. A plurality of legs (4) bend along with the curvature of the equipment (5). Each leg has a self-adhesive bottom surface that sticks to the equipment.

Note that if the electronic device is rigid, once it is tightly strapped to the body with cable ties, the body will have a very reduced ability be bend, since it is fixed to the rigid device. However, no matter how hard the cable ties are tightened, the legs of the mount can still bend independently, and follow the curve of the equipment regardless of whether the electronic device is rigid or not.

In addition, a plurality of wall segments (6) are designed to block a stream of water or wind that may come from a direction as illustrated by arrow (7). This prevents the water or wind from getting under the electronic device and applying lifting force on the said device, reducing the chance of the mount being flushed or blown away by wind or water.

Figure 4:
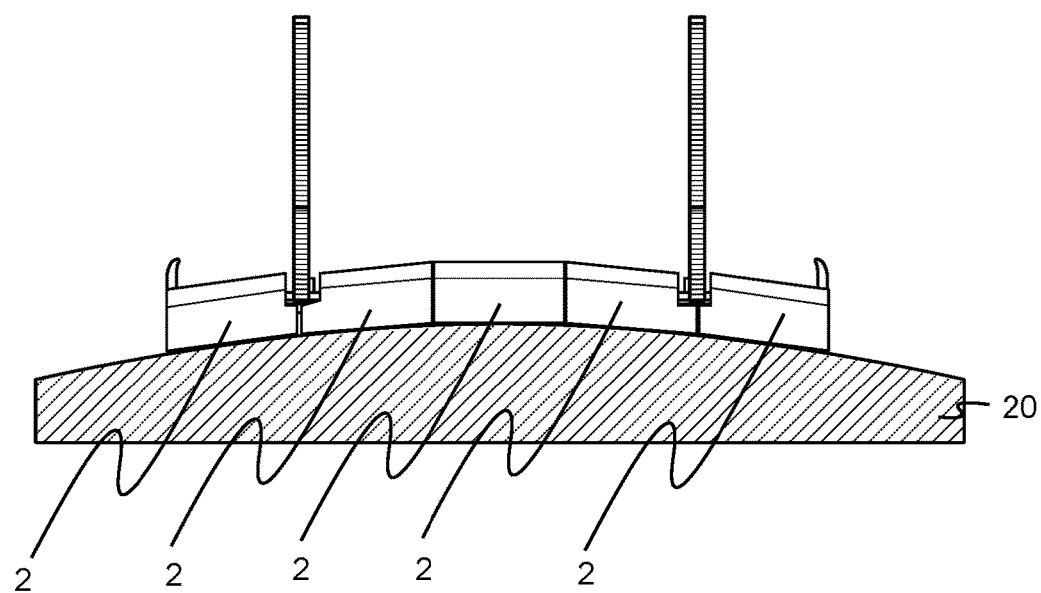
FIG. 4 shows the mount from the side (View B).

FIG. 4 illustrates the mount from the side (View B). A plurality of legs (1) with self-adhesive bottom is attached to equipment (2). Note that each leg can bend to a different degree, allowing the mount to adapt to curvatures with irregular shapes.

In some implementations, a transparent shrink tube is used as enclosure. The material if the shrink tube may be PVC (polyvinyl chloride). The device is placed inside the tube, and heat is applied so that the tube shrinks around the shape of the enclosed devices. The two openings of the tube are then welded together by applying heat, to create a hermitically sealed device that is fully waterproof.

The device may be placed inside an outer hard case that offer additional protection. In particular, the outer case protects the welded seams of the shrink tube from mechanical impact and direct sun light that could otherwise damage the device. Once affixed by the mount, the electronic device is enabled to perform a variety of functions, as described further below.

Motion Detector for Boats

U.S. Patent Publication No. 2019/0141178, the contents of which are incorporated by reference herein for all purposes, describes a motion sensor that comprises a gyroscope to determine whether a boat is moving by measuring changes to the direction the boat is heading. As an alternative to using a gyroscope to measure changes in the boat's direction, a magnetometer (i.e. compass) can be used to detect the direction. The benefit of using a compass instead of a gyroscope is that the compass may require less power consumption and can also be powered down between measurements. Many gyroscopes will require to be powered on in order to determine if the angle has been changed between two points in time.

Alert Warning System for Water Exposure that can Cause Damage to Jet-Ski

Some parts within a Jet-Ski's propulsion system, including, but not limited to, engine, crank case, and exhaust system, are actually sensitive to water. If water leaked into said parts, it is important to evacuate the water before running the engine, to avoid damages to the propulsion system. If a jet-ski is placed upside down in water for a prolonged amount of time, it is possible that water will leak into said propulsion system.

As described in U.S. Patent Publication No. 2019/0141178, the contents of which are incorporated by reference herein for all purposes, an apparatus has the ability to transmit GPS location over a mobile network. The described device also comprises motion sensors that may include, without limitation, a gyroscope, an accelerometer and a magnometer. These capabilities are extended, according to the present disclosure.

The apparatus includes a built-in motion sensor, which can detect a boat capsizing by measuring the orientation of the boat in a three-dimensional (3D) space, can also be configured to detect whether a jet-ski is upside down, and measure the time duration of the jet-ski being upside-down. The apparatus can be configured to regularly report the duration of the "upside-down" event to a server. If the duration exceeds a pre-set threshold, the server will issue a text alert that can be sent to appropriate person(s), providing information that the jet-ski has been up-side down, along with a recommendation to inspect the propulsion system.

Collision Detection and Motion Intensity Detection

In some implementations, an apparatus can be configured as a tracker by integrating a motion sensor that includes an accelerometer that can be used to provide real time text alerts in cases when a vehicle has been in a collision or is being driven recklessly, across a range of different type of vehicles including but not limited to golf carts, bikes, boats and jet-skis.

The motion sensor of the above-mentioned apparatus includes an accelerometer that is configured to measure acceleration in the X, Y and Z dimensions. The acceleration in X, Y and Z dimensions is measured at a certain sample rate Fs, for example 10 Hz. At each sample, a "Motion Intensity" value MI is calculated by an algorithm in the microprocessor as $MI(n)=\max(abs(X(n)-X(n-1)), abs(Y(n)-Y(n-1)), abs(Z(n)-Z(n-1))$, where $X(n)$ is the measured acceleration in X dimension at the nth sample occasion. In other words, the motion intensity is the change in acceleration value between two samples, where one value is calculated for each dimension in space.

Every Mth sample, the "Maximum Motion Intensity" value MM is calculated as the maximum value of the M most recent motion intensity values. The apparatus then transmits the calculated MM values to a server via an HTTP request. For typical values of N and Fs, the apparatus will transmit MM values to the server at an interval, such as every couple of minutes, along with other measurement performed by the apparatus, such as GPS coordinates obtained by the built-in GPS tracker.

These values are transmitted from the tracker to a server, where the tracker may be using cellular data to connect to the Internet. As the server receives the reported MM values, these values are compared to thresholds "Tr" and "Tc", where Tr is the threshold for "reckless driving" and Tc is the threshold for a collision. If the MM value is greater than Tr, the server will send a text alert (SMS) indicating that the vehicle is being driven recklessly, and if the MM value is greater than Tc, the server will send a text alert indicating that the vehicle may have experienced a collision.

The challenge is to determine appropriate values for Tr and Tc, as these can vary between each vehicle and type of vehicle. For example, the threshold values that apply for a golf cart may be very different to those appropriate for a boat or a jet-ski.

The method of determining Tc and Tr is done by an experimental approach, using feedback from appropriate person with knowledge about the vehicle's operation for a specific trip, that can provide information whether there were any incidents of reckless driving or collisions during said trip. Based on the feedback, measured motion intensity values can be correlated to such events, and the Tc and Tr threshold can be determined.

The threshold values are set for each individual vehicle. The server also keeps track on different types of vehicles. So, for example, if a new golf cart is added, before it has been determined, the default thresholds will be set to the average of previously evaluated vehicles of the same type.

Capsize Detection Using Accelerometer

The usability of a "capsize detection" feature has been described above. A gyroscope is configured to detect an orientation of an object in 3D space, and hence can be used to determine whether an object is upside down. However, in some implementations, a capsize detection algorithm that is based on only using an accelerometer is presented, since an accelerometer may be obtained at a lower cost and consume less power than a gyroscope.

Although an accelerometer can detect gravity, which is detected as an acceleration towards the center of the earth, and thus can detect whether an object is sideways or upside down, this may only work well if the object is at rest. If the object is subject to strong and unpredictable movements, such as when mounted on a speeding jet-ski, the applied motions make it difficult for the accelerometer to determine the orientation of the object. Accordingly, an apparatus is configured to make use of the fact that a capsized vehicle has very limited motions since it in incapable of driving in this state.

The capsize detection apparatus works as follows: an accelerometer that measures acceleration in three dimensions (3D) is connected to a microprocessor that runs the capsize detection algorithm. The algorithm reads acceleration values at an interval of T seconds, where T may be 1 second. The sampled acceleration values are compared to a set of reference values that are set so that if the acceleration is close to these reference values (within a certain threshold Tcap), the algorithm determines that the object has a "potential capsize". Note that a "potential capsize" detection can happen either because the object it upside down, or just as a result of a random movement event of the object. The algorithm maintains a counter that increments every time a potential capsize is detected. If a sample is classified as not a "potential capsize" the counter gets reset to 0. Also, if the algorithm detects a "strong motion" which is classified as the motion intensity (as described above) being higher than a set threshold, the counter is also reset, since a high motion intensity indicates that the object is in significant motion, and hence a "potential capsize" detection is dismissed as an unreliable sample.

The thresholds that are used classify potential capsize and strong motion, can be set remotely. The apparatus connects to a server via a cellular network to upload detected acceleration values as well as to download new threshold values on a regular basis. The thresholds can be controlled by a user via a mobile phone or computer connected to the Internet. Thus, a user can observe for example a jet-ski being operated, and at the same time view the measured acceleration values that are generated from the apparatus mounted on the jet-ski, via an Internet connected device such as a mobile phone. The user can then empirically compare measured values for when the jet-ski is capsized, when the jet-ski is in normal orientation, when the jet-ski is in motion and when the jet-ski is still. The user can thus in real time adjust the thresholds until the appropriate values are found that can be used to classify a capsize event, while minimizing the number of false detections.

The capsize detection apparatus helps avoid sea-tow fees and damage to the vessel. The apparatus and system can generate and send SMS messages and alerts to the business owner or manager of the vessel.

Prevention of Speeding with No Wires to Connect

The below-described approach has the benefit of not requiring an electrical connection to the vessel, thus reducing the installation effort. U.S. Patent Publication No. 2016/0269530, incorporated by reference herein for all purposes, discloses a waterproof wireless communication apparatus. U.S. Patent Publication No. 2018/0033311, also incorporated by reference herein for all purposes, describes a GPS tracking device and client application for managing fleet equipment.

By using a solar powered GPS tracker combined with an audible siren, a solution that require no wires at all can be accomplished. The solar panel reduces the need to connect the device to the vessel's battery or other power source, and the audible siren is used to alert the driver that the speed is exceeded, so that the driver can manually reduce the speed. The frequency of the audible siren can be set to range between 2300 and 2900 Hz, which empirical testing has shown to effectively cut though the engine noise of a jet ski.

The GPS tracker downloads geofence information from a server via mobile telephony. Since the GPS tracker is powered by a battery that is charged from a solar panel, special consideration has been made to make the device as power efficient possible. This is done by using an algorithm that combines knowledge of the jet-skis current location, speed and heading to estimate the time T it would take to reach the nearest geofence region. So, once a GPS location has been obtained, the algorithm will evaluate T, and then put the GPS module to sleep for a duration that may be T/2 seconds in order to save power. Once the set sleep time has passed, the GPS module will power up again to obtain a new GPS location, evaluate a new value of T and go back to sleep again. Thus, the closer the tracker is to a geofence, the shorter the interval will be between GPS samples. The evaluated T value may in addition be constrained to an upper and lower boundary.

Gamified Boating Experience with Audible Siren

The abovementioned apparatus can also be used to create a gamified boating experience. A "gamer" is a boat driver that is participating in the game. The game can incorporate additional geofence types, that may include but is not limited to one or more of a "Start Line" fence, a "Finish Line" fence, a "Checkpoint" fence and a "Penalty" fence. A boat enters a new game when entering or passing through the "Start Line" fence, and exits the game when entering or passing through the "Finish Line" fence. A duration of the game is the time from entering the "Start line" fence until entering the "Finish Line" fence. In some implementations, during the game, the gamer can obtain gaming points by crossing into "checkpoint" geofences. The gamer may lose gaming points by crossing into "penalty" geofences.

A gamer can register to participate in a game by sending a text message from a mobile phone to a special phone number that accepts gamer registration. The text message may include information such as an ID number that uniquely identifies the GPS tracker that is located on the player's boat, as well as a player nickname that is used to identify the player during the game. A plurality of text messages may be sent back to the boater providing confirmation of the registration as well as progress of the game during the game, and results after the game.

At the end of the game, a text message may be sent back to the gamer, the text message containing information about the total number of points achieved as well at the total duration of the game. A text message may contain a leader board showing a list of players with their corresponding points and play duration.

In some implementations, a game can contain multiple "laps" so that when a gamer reaches the "finish line", a new lap is started, and the game continues until a specified number of laps have been completed. A player may be required to enter a number of "checkpoint" fences or other fences within each lap in order to complete the lap.

The audible siren may be used to notify the gamer that said gamer enters a geofence. Different audible tone sequences may be used for different type of geofences. Speed limit fences may be used to deduct points if a gamer exceeds the speed limit in certain geographic regions, thus encouraging adherence to speed limits and boat safety during the game.

Although a few embodiments have been described in detail above, other modifications are possible. Other embodiments may be within the scope of the following claims.

The invention claimed is:

1. A system for managing a vehicle, the system comprising:
   a mount for coupling to a contour of a surface of the vehicle, the mount having a tracking device, the tracking device comprising:
   a flexible, waterproof outer enclosure having one or more solar panels for converting solar energy to electricity for the tracking device, the flexible, waterproof outer enclosure further including a coupling feature that releasably couples and conforms the tracking device to an outer surface of the rental equipment;
   a rigid inner enclosure housed by the flexible, waterproof outer enclosure and under the one or more solar panels; and
   a global positioning system (GPS) device embedded in the rigid inner enclosure and being powered by electricity from the one or more solar panels;
   a transceiver embedded in the rigid inner enclosure and being powered by electricity from the one or more solar panels, the transceiver for receiving and transmitting signals to and from a communication network;
   a plurality of message buttons adjacent to the one or more solar panels, each message button being associated with a distinct message and configured to, when depressed, cause a message logic circuitry to generate the distinct message for transmission via the transceiver; and
   logic circuitry embedded in the rigid inner enclosure and being powered by electricity from the one or more solar panels, the logic circuitry receiving GPS data from the GPS device and sending the GPS data to the transceiver for transmitting by the transceiver to the communication network, the logic circuitry including the message logic circuitry; and
   a server system executing a vehicle management application, the server system receiving the GPS data from the tracking device coupled to the vehicle via the communication network, and processing the GPS data to generate a set of analytical information representing geographical data associated with the vehicle;

wherein the mount is configured to automatically adapt to the contour of the surface of the vehicle to hold the tracking device.

\* \* \* \* \*